(12) United States Patent
Inbaraj et al.

(10) Patent No.: US 8,495,618 B1
(45) Date of Patent: Jul. 23, 2013

(54) UPDATING FIRMWARE IN A HIGH AVAILABILITY ENABLED COMPUTER SYSTEM

(75) Inventors: Joseprabu Inbaraj, Lawrenceville, GA (US); Jothiram Selvam, Tucker, GA (US)

(73) Assignee: American Megatrends, Inc., Norcross, GA (US)

( * ) Notice: Subject to any disclaimer, the term of this patent is extended or adjusted under 35 U.S.C. 154(b) by 444 days.

(21) Appl. No.: 12/751,424

(22) Filed: Mar. 31, 2010

(51) Int. Cl.
*G06F 9/44* (2006.01)

(52) U.S. Cl.
USPC .......................................... 717/173; 717/172

(58) Field of Classification Search
None
See application file for complete search history.

(56) References Cited

U.S. PATENT DOCUMENTS

| | | | |
|---|---|---|---|
| 6,675,258 B1 * | 1/2004 | Bramhall et al. | 711/114 |
| 7,814,479 B2 * | 10/2010 | Douglas et al. | 717/173 |
| 2008/0052699 A1 * | 2/2008 | Baker et al. | 717/168 |
| 2010/0050168 A1 * | 2/2010 | Sharonov | 717/173 |
| 2010/0199272 A1 * | 8/2010 | Mahajan et al. | 717/171 |
| 2011/0131563 A1 * | 6/2011 | Ohama et al. | 717/168 |
| 2011/0173297 A1 * | 7/2011 | Moriya | 709/217 |

* cited by examiner

*Primary Examiner* — Isaac Tecklu
*Assistant Examiner* — Hossain Morshed
(74) *Attorney, Agent, or Firm* — Morris Manning & Martin, LLP; Tim Tingkang Xia, Esq.

(57) ABSTRACT

Technologies are provided herein for seamlessly updating firmware in a high availability enabled solution. A system for updating firmware in a high availability enabled solution includes a first active node that is functional on the system and which is connected to a firmware update client and a second passive node that is in an active-passive relationship with the first node. The first node receives a firmware update command and retrieves the updated firmware from the firmware update client. The first node then updates firmware of the second node using the updated firmware. Upon updating the firmware of the second node, the first node sets an indicator flag associated with the second node, which notifies the second node to become the active node upon being rebooted. The first node then reboots the second node, which then updates the firmware of the first node with the updated firmware.

19 Claims, 6 Drawing Sheets

BEFORE FIRST NODE RECEIVES FIRMWARE UPDATE

AFTER FIRST NODE RECEIVES UPDATED FIRMWARE

AFTER SECOND NODE RECEIVES NEW UPDATED FIRMWARE

AFTER FIRST NODE UPDATES SECOND NODE WITH NEW UPDATED FIRMWARE

UPDATING FIRMWARE IN A HIGH AVAILABILITY ENABLED COMPUTER SYSTEM

BACKGROUND

Typical high availability computer systems include an active node, which is in control of the system and a passive node, which is not in control of the system but may become available if the active node fails. In this way, the computer system is always or nearly always available. Like in many other systems, high availability computer systems may also periodically go through a system upgrade, which may include updating the firmware of the nodes, installing additional components or replacing failed components with working components.

During a system upgrade involving updating the firmware of the nodes, some older high availability computer systems bring down the active node and do not let the passive node take control of the system while the active node is brought down due to inherent limitations within the computer system. In such systems, both the nodes are down at the same time, leaving the computer system unavailable for the duration of the system upgrade. This may be undesirable because the computer system becomes unavailable for the duration of the system upgrade.

In more recent high availability computer systems, a system upgrade may be performed with zero downtime, which means that the computer system is always available during the system upgrade. In these systems, the passive node may undergo a firmware update while the active node has control of the computer system. Once the firmware update at the passive node is complete, the passive node takes control of the system and the active node undergoes the firmware update. However, these systems require significant user interaction during the system upgrade, which may be undesirable in situations where a user is unavailable at the location of the system or during the entire system upgrade process.

It is with respect to these and other considerations that the disclosure presented herein has been made.

SUMMARY

Technologies are provided herein for updating firmware in a high availability enabled computing system. In particular, through the use of the technologies provided herein, a firmware update client may seamlessly update the firmware at both an active node and a passive node with zero downtime.

According to one aspect presented herein, a system for updating firmware in a high availability enabled computer system includes a first node that operates a first current firmware and stores an updated firmware. The first node is in control of the computer system. The first node is configured to update a second current firmware that is operated by a second node with the stored updated firmware. Upon updating the second current firmware, the first node sets a second indicator flag on the second node, which notifies the second node to update the first current firmware of the first node upon rebooting the second node. After the second indicator flag is set, the first node reboots the second node, which then updates the first current firmware of the first node with the updated firmware.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
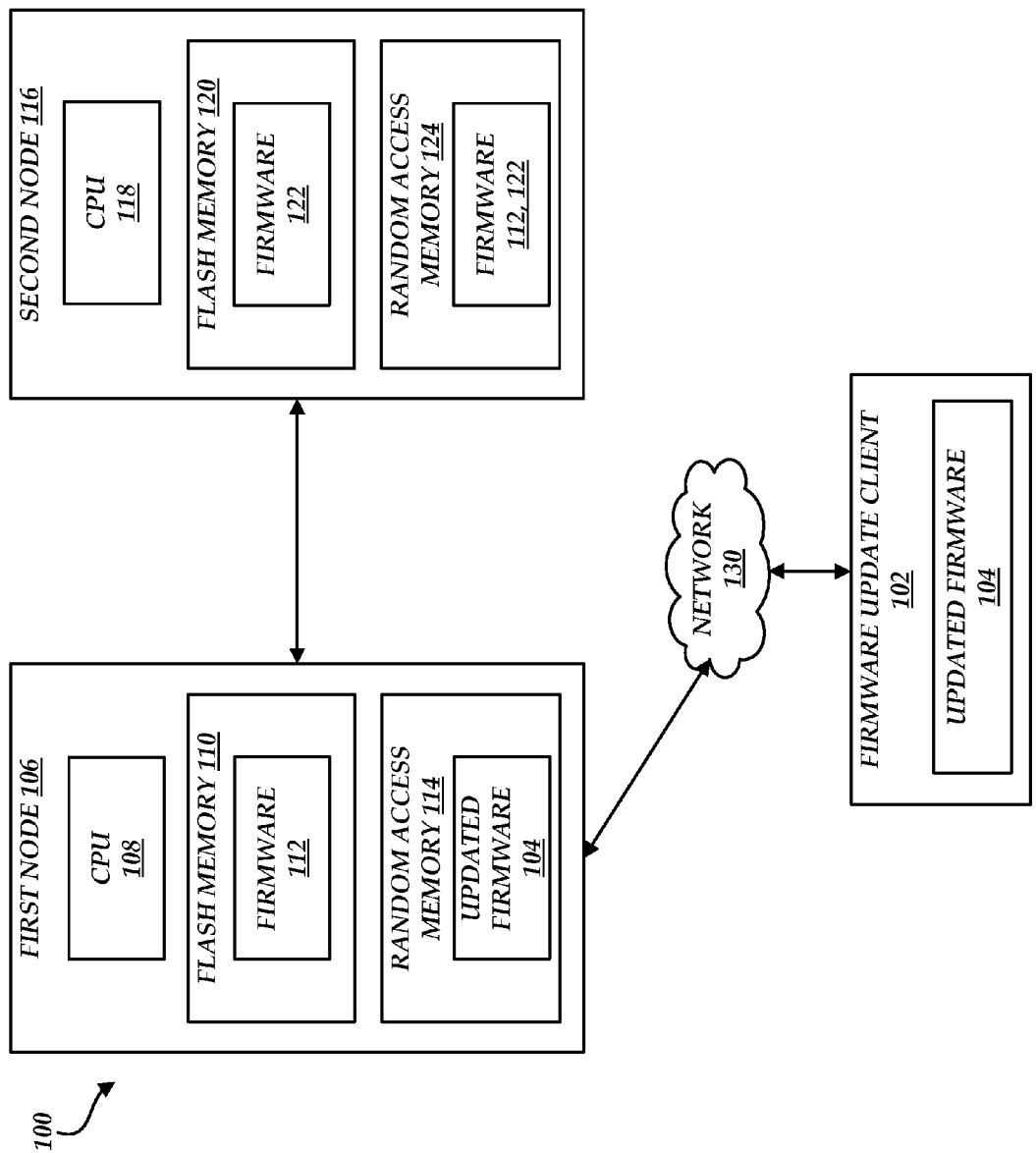
FIG. 1 is a network and computer architecture diagram showing aspects of a firmware update client, a first node, and a second node provided in one embodiment presented herein.

The following detailed description is directed to technologies for updating firmware in a high availability enabled computer system. In particular, through the use of the technologies provided herein, a firmware update client may seamlessly update the firmware at both an active node that controls the computer system and a passive node that is available to take control of the computer system if the active node fails, with zero downtime. In this way, firmware updates in high availability enabled computer systems may be performed with little or no human interaction and without having to bring down the first and second nodes simultaneously.

Examples of high availability enabled computer systems may include a resource management system that has two resource managers, such as service processors or nodes, which manage resources. In high availability enabled computer systems, such as the resource management system, it is desirable that at least one of the two resource managers is available to process calls to the resource management system. To do so, the two resource managers may operate in an active-passive relationship. In the active-passive relationship, a first resource manager may operate in active mode, and a second resource manager may operate in passive mode. While in active mode, the first resource manager controls the resource management system. While in passive mode, the second resource manager does not control the resource management system but can become available to control the resource management system in the event that the first resource manager fails. When the first resource manager goes down, the first resource manager switches from operating in active mode to operating in passive mode, thereby ceasing control of the resource management system. The second resource manager also switches from operating in passive mode to operating in active mode, thereby taking over the control of the resource management system.

The problem arises, however, when the resource management system has to go through a system upgrade, which includes updating the firmware at both the resource managers. In the past, both resource managers were brought down simultaneously to update the firmware of the two resource managers or significant human interaction was required to implement the firmware update at the resource managers without having to bring down both the resource managers at the same time.

The present disclosure provides a high availability enabled solution that includes a firmware update client that is configured to communicate with the active node of the resource management system. In an example, a first node is the active node, and a second node is the passive node. The firmware update client has an updated firmware, which is sent to the active node (i.e., the first node). Upon receiving the updated firmware, the first node updates previous firmware stored in the passive node (i.e., the second node) one block at a time using the updated firmware. Once the first node updates the firmware at the second node is updated, the first node reboots the second node. Upon rebooting, the second node is set as the active node, and the first node is set as the passive node. The second node, which is now the active node, may then update the firmware of the first node, which is now the passive node, with the updated firmware such that both the second node and the first node have updated their respective firmware with the updated firmware.

In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments.

FIG. 1 is a network and computer architecture diagram showing a system 100 provided herein that includes a firmware update client 102, a first node 106 and a second node 116. The firmware update client 102 may be communicatively coupled to the first node 106 via a network 130. The network 130 may be a local area network ("LAN"), a wide area network ("WAN") such as the Internet, or other type of network. The firmware update client 102 stores an updated firmware 104. The firmware update client 102 may also include other hardware and/or software components for performing various operations, such as receiving input from a user, and others that will be described in further detail with regard to FIGS. 2A-2C.

The first node 106 may include a central processing unit (CPU) 108, a flash memory 110 configured to store a first current firmware 112 that operates on the first node, and a random access memory (RAM) 114 that is configured to store the updated firmware 104. The second node 116, which is in communication with the first node 106, may also include a CPU 118 and a flash memory 120 configured to store a second current firmware 122 that operates on the second node. The second node 116 may also include a RAM 124 that may currently store an image of the first and second current firmware 112, 122 but may be utilized to store an updated version of the updated firmware 104 that the second node 116 may directly receive from the firmware update client 102 while the second node 116 operates as the active mode. In alternate embodiments, the RAM 124 may be empty until the second node 116 becomes the active node, and receives a new updated firmware that is newer than the updated firmware 104. Details of the firmware stored in the RAM 114 of the first node 106 and the RAM 124 of the second node 116 will be described in further detail with regard to FIGS. 3A-D.

The firmware update client 102 is configured to update the first current firmware 112 and the second current firmware 122 with the updated firmware 104 that is stored in the firmware update client 102. The updated firmware 104 may be a newer version or an older version of the first and second current firmware 112, 122. In some applications, it may be desirable to update, or in this case, downgrade the current firmware with an older version of the current firmware. For instance, when the current firmware is not compatible with older system components, it may be desirable to downgrade the current firmware with an older version of the firmware such that the older system components may become operational on the system. In other applications, it is usually desirable to update the current firmware with a newer version of the firmware for various reasons, such as enhancing the performance of the system, operating newer system components, and the like.

The first node 106 and the second node 116 may be computers, service processors, resource managers or any other types of computing devices. The first node 106 is in communication with a second node 116 such that the first node 106 and the second node 116 are configured to operate in an active-passive relationship. In an active-passive relationship, one of the first node 106 or the second node 116 will be operating in an active mode and the other node will be operating in a passive mode. For the sake of convenience and clarity, a node operating in active mode will be referred to herein, as an active node, and a node operating in passive node will be referred to herein, as a passive node. The active node is in control of the system 100 such that it is actively participating on the system 100, including performing all of the functions for which the nodes are responsible. The passive node is not in control of the system 100 and therefore, does not actively participate on the system. The passive node therefore, is not even able to update its own firmware. Rather, the active node is configured to update the firmware of the passive node.

In an illustrative example, the first node 106 is the active node in the system 100, and the second node 116 is the passive node in the system 100. While the first node 106 is the active node and the second node 116 is the passive node, the first node 106 is in control of the second node 116, such that the first node 106 is configured to update the second current firmware 122 with the updated firmware 104 stored in the first node 106.

In particular, the first node 106 is configured to communicate with the firmware update client 102 once the firmware update client 102 establishes a connection with the first node 106. Thus, upon establishing the connection with the first node 106, the first node 106 is configured to receive the updated firmware 104 from the firmware update client 102 and store the updated firmware 104 in the RAM 114. Upon successfully receiving the updated firmware 104 from the firmware update client 102 and storing the updated firmware 104 in the RAM 114 of the first node 106, the first node 106 may receive a firmware update command from the firmware update client 102 to begin the firmware update process. In alternate embodiments, the firmware update command may be provided to the first node 106 from a user operating the first node 106 or from a user remotely connected to the first node 106.

Once the first node 106 receives the firmware update command, the first node 106 may execute the firmware update command to update the second current firmware 122 of the second node 116 with the updated firmware 104 stored in the first node 106. Details regarding updating the firmware of the second node 116 with the updated firmware 104 stored in the first node 106 will be described with regard to FIGS. 2-4, which illustrate the firmware update process in further detail. After the second current firmware 122 has been updated with the updated firmware 104, the second node 116 may be set in active mode, after which the second node 116 is configured to update the first current firmware 112 with the updated firmware 104. Details of setting the second node 116 in active mode will be described in further detail with regard to FIGS. 3 and 4.

Figure 2A:
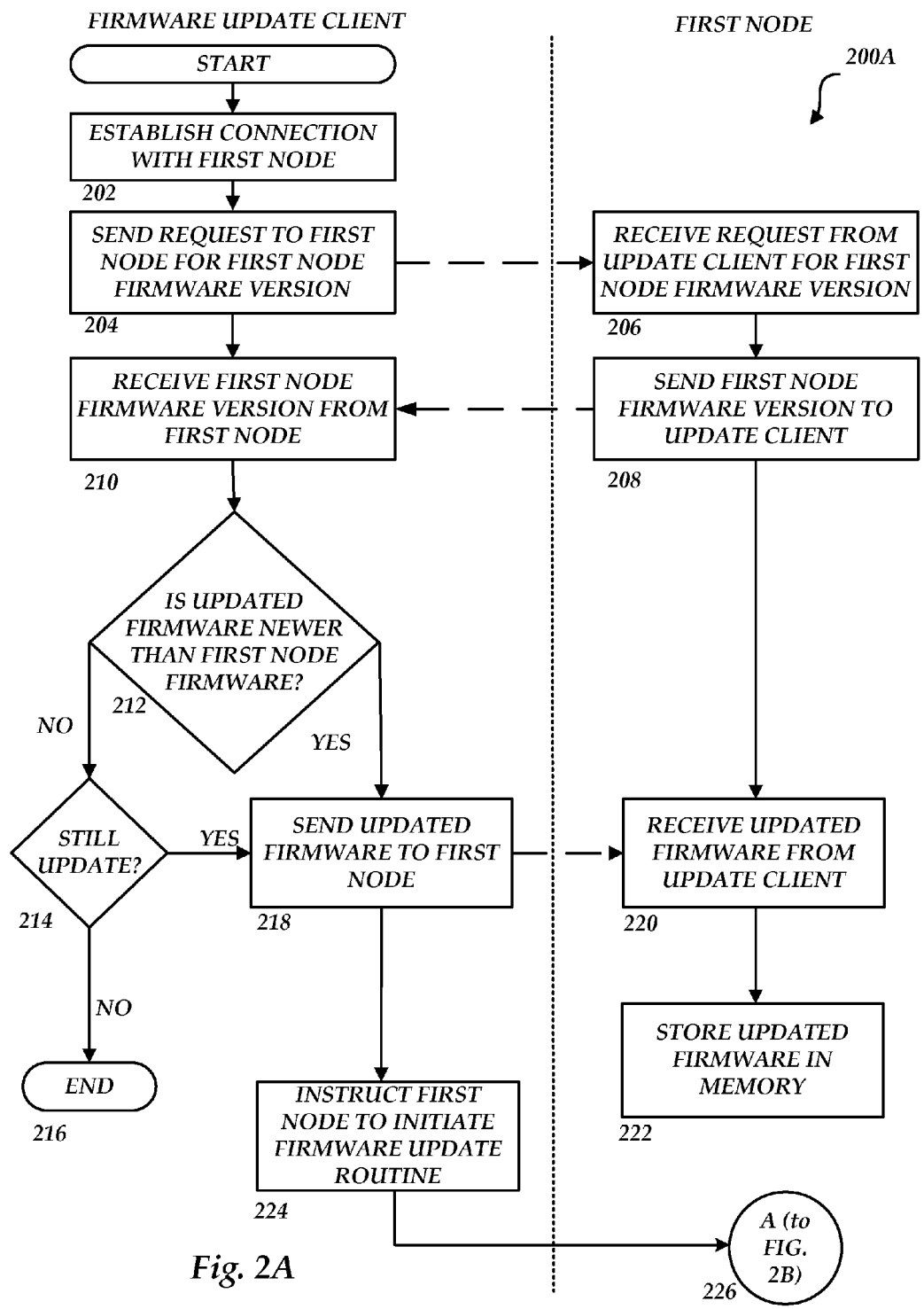
FIG. 2A is a flow diagram showing aspects of the operation of a firmware update client and the operation of the first node provided in one embodiment presented herein.
Figure 2B:
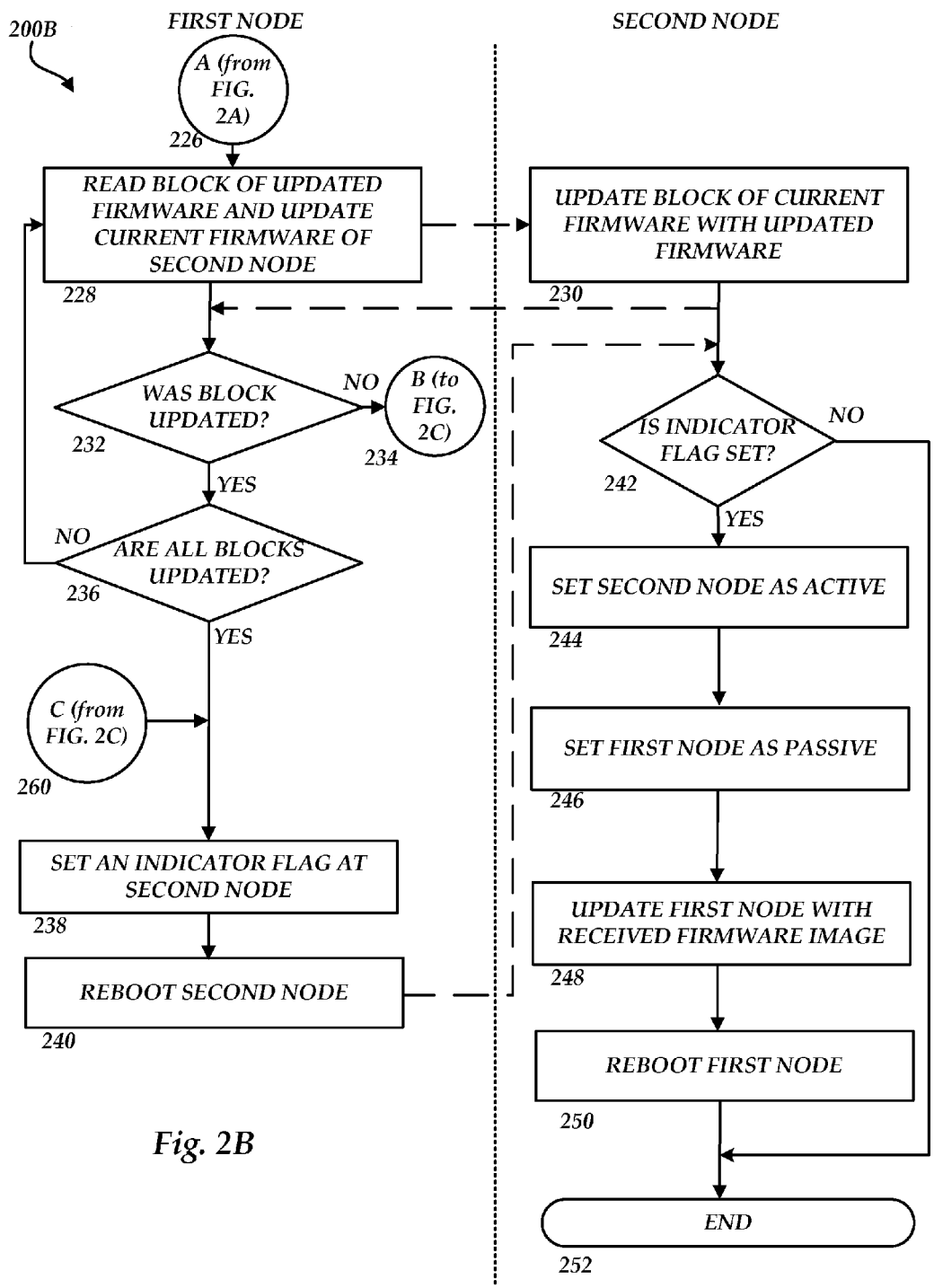
FIG. 2B is a flow diagram showing aspects of the operation of the first node and the operation of a second node provided in one embodiment presented herein.
Figure 2C:
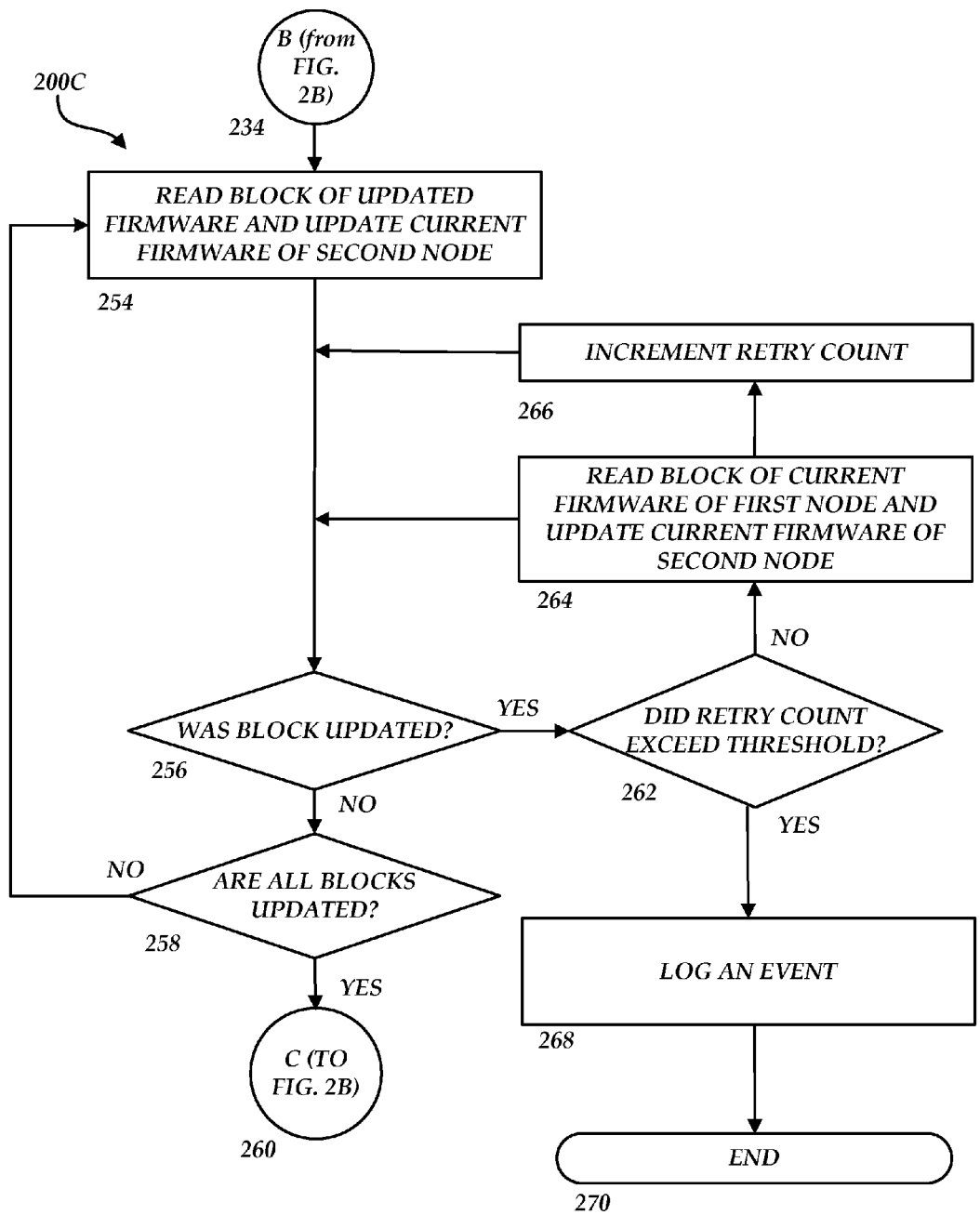
FIG. 2C is a flow diagram showing aspects of the operation of the first node when updating the firmware of the second node provided in one embodiment presented herein.

The firmware update process generally describes how the first current firmware and the second current firmware are updated with the updated firmware. According to the present disclosure, FIGS. 2A-2C illustrate the firmware update process, which includes various routines 200A-200C that are illustrated in FIGS. 2A-2C. FIG. 2A describes a routine 200A that illustrates establishing a connection between the firmware update client 102 and the first node 106 as well as storing the updated firmware 104 in the RAM 114 of the first node 106. FIG. 2B describes a routine 200B that illustrates the first node 106 updating the second current firmware 122 first, and then the second node 116 updating the first current firmware 112 of the first node 106. FIG. 2C describes a routine 200C for updating the second current firmware 122 using the first current firmware 112 in the event that the updated firmware 104 fails to update the second current firmware 122.

Referring now to FIG. 2A, a flow diagram showing operations performed by the firmware update client 102 and the first node 106 in one embodiment are presented herein. In particular, FIG. 2A is a flow diagram illustrating a routine 200 for establishing a connection between the firmware update client 102 and the first node 106 operating in active mode, and sending the updated firmware 104 to the first node 106, as provided in one embodiment presented herein. It should be appreciated that the logical operations described herein with respect to the various figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where the firmware update client 102 establishes a connection with the first node 106, which is designated as the active node, in an illustrative example. According to embodiments, the firmware update client 102 may establish a connection with any node that is active on the system 100. The active node may be configured with a network address through which the firmware update client 102 may be configured to communicate with the active node. From operation 202, the routine 200A proceeds to operation 204, where the firmware update client 102 sends a request to the first node 106 to determine the version of the first current firmware 112. From operation 204, the routine 200A proceeds to operation 206, where the first node 106 receives the request from the firmware update client 102. From operation 206, the routine 200A continues to operation 208, where the first node 106 responds to the request and sends the version of the first current firmware 112 to the firmware update client 102. From operation 208, the routine 200A proceeds to operation 210, where the firmware update client 102 receives the version of the first current firmware 112 from the first node 106.

Upon the firmware update client 102 receiving the firmware version of the first current firmware 112 at operation 210, the routine 200 continues to operation 212, where the firmware update client 102 determines if the updated firmware 104 stored in the firmware update client 102 is newer than the first current firmware 112. According to embodiments, the firmware update client 102 may compare the version of the updated firmware 104 stored in the firmware update client 102 with the version of the first current firmware 112.

If the updated firmware 104 stored in the firmware update client 102 is not newer than the first current firmware 112, the routine 200A proceeds from operation 212 to operation 214. At operation 214, the firmware update client 102 solicits permission from a user to confirm whether the firmware update client 102 should send the updated firmware 104 stored at the firmware update client 102 to the first node 106. The permission may be in the form of a user input. It should be appreciated that the user may provide this permission from the first node locally or through a remote connection. This operation may be desirable to prevent the first current firmware 112 at the first node 106 from being downgraded accidentally. By requiring that a user provides permission to confirm whether the firmware update client 102 should send the updated firmware 104 to the first node 106, accidental firmware downgrades may be avoided. In alternate embodiments, in the event that the updated firmware 104 is older than the first current firmware 112, the firmware update client 102 may automatically send the updated firmware 104 to the first node 106 even if it is older than the first current firmware 112 without soliciting permission from a user.

At operation 214, if the user provides permission to the firmware update client 102 instructing the firmware update client 102 not to send the older firmware stored in the firmware update client 102 to the first node 106, the routine 200A ends at operation 216. However, if the user provides an input instructing the firmware update client 102 to send the older firmware stored in the firmware update client 102 to the first node 106, the routine 200A proceeds from operation 214 to operation 218.

At operation 212, if the updated firmware 104 stored in the firmware update client 102 is newer than the first current firmware 112, the routine 200A automatically proceeds to operation 218. At operation 218, the firmware update client 102 sends the updated firmware 104 to the first node 106. It should be appreciated that the routine 200A could include an additional operation that solicits permission from the user to confirm whether the updated firmware 104 stored in the firmware update client 102 should be sent to the first node 106.

From operation 218, the routine 200A proceeds to operation 220, where the first node 106 receives the updated firmware 104 from the firmware update client 102. Once the first node 106 receives the updated firmware 104 at operation 220, the routine 200A proceeds to operation 222, where the first node 106 stores the updated firmware 104 in the RAM 114 of the first node 106. Also, after the firmware update client 102 sends the updated firmware 104 to the first node 106 at operation 218, the routine 200A proceeds from operation 218 to operation 224, where the firmware update client 102 then sends a firmware update command to the first node 106 instructing the first node 106 to begin updating the firmware at the first node 106 and the second node 116 using the updated firmware 104. As the first node 106 receives the firmware update command from the firmware update client 102, the routine 200A continues to the routine 200B.

As described above, updating the firmware at the first node 106 and the second node 116 using the updated firmware 104 involves updating the current firmware 112, 122 at the first node 106 and the second node 116 respectively with the updated firmware 104 provided by the firmware update client 102. Once the first node 106 receives the firmware update command to begin updating the current firmware 112, 122, the first node 106, which is the active node, is configured to update the second current firmware 122 of the second node 116 with the updated firmware 104. According to embodiments, the updated firmware 104 may be divided into blocks so that the firmware update can be executed in stages. In this way, the firmware update does not have to start from the beginning in the event that a portion of the updated firmware 104 fails to update. Instead, by updating the second current firmware 122 with the updated firmware 104 one block at a time, even if one of the blocks of the updated firmware 104 fails to update the current firmware, the blocks of firmware that were previously successfully updated do not have to be updated again.

Once the second current firmware 122 of the second node 116 has been updated with all the blocks of the updated firmware 104, the second node 116 is set in active mode and the first node 106 is now operating in passive mode. The second node 116, which is now active, may then update the first current firmware 112 of the first node 106 with the updated firmware 104 that is stored in the flash memory 120 of the second node 116, such that the current firmware 112, 122 of both the first node 106 and the second node 116 are now updated with the updated firmware 104. Additional details regarding the firmware update process will be provided with regard to FIG. 2B.

FIG. 2B is a flow diagram showing operations performed by the first node 106 and the second node 116 during the firmware update process in one embodiment presented herein. In particular, FIG. 2B is a flow diagram illustrating a routine 200B for updating the second current firmware 122 using the updated firmware 104 stored on the first node 106, as provided in one embodiment presented herein. The routine 200B begins at operation 226, where the first node 106 receives the firmware update command from the firmware update client 102. From operation 226, the routine 200B proceeds to operation 228, where the first node 106 reads a block of the updated firmware 104 and updates a corresponding block of the second current firmware 122. From operation 228, the routine 200B proceeds to operation 230, where the corresponding block of the second current firmware 122 is updated with the read block of the updated firmware 104. From operation 230, the routine 200B proceeds to operation 232, where the first node 106 determines if the block of the updated firmware 104 was successfully updated at the second node 116. If the block of the updated firmware 104 was not successfully updated at the second node 116, the routine 200B proceeds to operation 234, where a separate routine 200C is executed, as will be described below in regard to FIG. 2C.

At operation 232, if the block of the second current firmware 122 is successfully updated, the routine 200B proceeds to operation 236, where the first node 106 determines if all of the blocks of the second current firmware 122 have been successfully updated. If all of the blocks of the second current firmware 122 have not been successfully updated, the routine 200B returns back to operation 228, where the first node 106 reads the next block of the updated firmware 104 and updates the corresponding block of the second current firmware 122. Thus, the operations 228-236 may be repeated until the first node 106 has successfully updated all of the subsequent blocks of the second current firmware 122 with the subsequent blocks of the updated firmware 104.

At operation 236, if the first node 106 determines that all of the blocks have been successfully updated at the second current firmware 122 of the second node 116, the routine 200B proceeds to operation 238, where the first node 106 sets a second indicator flag on the second node 116. The second indicator flag is associated with the second node 116, and may be a bit, a series of bits, or some other indicator that indicates to the second node 116 that upon rebooting the second node 116, the second node 116 is to become the active node and update the first current firmware 112 of the first node 106. According to alternate embodiments, the first node 106 may not set the second indicator flag. In such cases, the second node 116 does not become the active node upon rebooting the second node 116 and therefore, cannot update the first current firmware 112. From operation 238, the routine 200B proceeds to operation 240, where the second node 116 is rebooted.

From operation 240, the routine 200B proceeds to operation 242, where the second node 116, upon rebooting, determines whether the second indicator flag is set. If the second indicator flag is not set, the routine 200B proceeds to operation 424, where the routine 200B ends with the rebooted second node 116 remaining in passive mode.

If, however, at operation 242, the second node 116 determines that the second indicator flag is set, the routine 200B proceeds to operation 244 where the second node 116 is set as the active node, such that the second node 116 is in control of the system 100. From operation 244, the routine 200B proceeds to operation 246, where the first node 106 that was previously the active node, is set as the passive node. It should be appreciated that in various embodiments, either the first node 106 or the second node 116 may be the active node. Therefore, when the second node 116 is set as the active node, the first node 106 is simultaneously or near simultaneously set as the passive node. According to embodiments, once the second node 115 determines from the second indicator flag that the second node 116 is to become the active node, the second node 116 may receive current information from the first node 106 and then inform the first node 106 that it is now becoming the active node and taking control of the system 100, thereby setting the first node 106 as the passive node.

From operation 246, the routine 200B proceeds to operation 248, where the second node 116, which is now the active node, updates the first node 106 to update the first current firmware 112 with the updated firmware 104. According to embodiments, the second node 116 may read blocks of the updated firmware 104 installed in the second node 116 and update the first current firmware 112 of the first node 106 one block at a time, similar to the way in which the first node 106 updated the second current firmware 122 of the second node 116 with the updated firmware 104, as previously described.

According to an alternate embodiment, the first current firmware 112 may be updated with the updated firmware 104 stored in the first node 106.

Once the first current firmware 112 has been updated with the updated firmware 104 at operation 248, the routine 200B proceeds to operation 250, where the first node 106 is rebooted. According to embodiments, the second node 116 may set a first indicator flag on the first node 106, such that when the first node 106 is rebooted after being updated, the first node 106 is set as the active node again and the second node 116 is set as the passive node. However, because the first node 106 and the second node 116 may be identical, once the second node 116 becomes the active node and updates the first current firmware 112, the second node may remain active until the respective firmware of the first node 106 and the second node 116 need to be updated again. It should be appreciated that the first indicator flag on the first node 106 may be identical or similar to the second indicator flag on the second node 116. From operation 250, the routine 200B ends at operation 252.

FIG. 2C is a flow diagram showing aspects of the operation of the first node 106 when updating the firmware of the second node 116 in one embodiment presented herein. As mentioned above with regard to operation 232 in FIG. 2B, if the block of the updated firmware 104 was not successfully updated at the second node 116, the routine 200B starts routine 200C at operation 234. The routine 200C is executed if the updated firmware 104 stored on the first node 106 fails to update a block of the second current firmware 122. In routine 200C, the first current firmware 112 updates the second current firmware 122.

The routine 200C begins at operation 234, where the first node 106 determines that the block of the updated firmware 104 has not successfully updated the corresponding block of the second current firmware 122 of the second node 116. From operation 234, the routine 200C proceeds to operation 254, where the first node 106 reads a corresponding block from the first current firmware 112 that corresponds to the block of the second current firmware 122 that was unable to be updated, and updates the block of the second current firmware 122. From operation 254, the routine 200C proceeds to operation 256, where the first node 106 determines whether the block of the second current firmware 122 is successfully updated using the corresponding block of the first current firmware 112. If the block of the second current firmware 122 is successfully updated, the routine 200C proceeds to operation 258, where the first node 106 determines whether all of the blocks of the second current firmware 122 have been successfully updated at the second node 116.

If the first node 106 determines that all of the blocks of the second current firmware 122 have not been updated at the second node 116, the routine 200C returns from operation 258 to operation 254, where the first node 106 reads the next block of the first current firmware 112 and updates a next block of the second current firmware 122 that is to be updated. In various embodiments, the first node 106 may update subsequent blocks of the second current firmware 122 at the second node 116 using subsequent blocks of the first current firmware 112. If at operation 258, the first node determines that the all of the blocks of the second current firmware 122 have been updated at the second node 116, the routine 200C proceeds to operation 260, which returns to the routine 200B, as shown in FIG. 2B.

At operation 256, if the first node 106 determines that the block of the first current firmware 112 is not successfully updated at the second node 116, the routine 200C proceeds to operation 262, where the first node 106 determines if a retry count has exceeded a threshold number of attempts. The retry count is the number of times a block of the first current firmware 112 has failed to successfully update the particular block of the second current firmware 122 at the second node 116. In this way, the first node 106 may stop attempting to update the second current firmware 122 after the retry count exceeds the threshold number of attempts. The threshold number of attempts may be predefined in the system 100 as an integer, such as three.

If the retry count has not exceeded a threshold number of attempts, the routine 200C proceeds to operation 264, where the first node 106 reads the same block of the first current firmware 112 and attempts to update the particular block of the second current firmware 122 again. From operation 264, the routine 200C proceeds to operation 266, where the first node increments the retry count by one. From operation 266, the routine 200C returns back to operation 256, where the first node 106 determines whether the block of the second current firmware 122 is successfully updated. If the first node determines that the block of the second current firmware 122 is successfully updated, the routine proceeds to operation 258, which has been described above. If at operation 262, it is determined that the retry count has exceeded the threshold number of attempts, the routine 200C proceeds to operation 268, where an event is logged. According to embodiments, the event may be logged and sent to a remote administrator indicating that the firmware update was unsuccessful. The firmware update process may then be aborted and the routine 200C proceeds to operation 270, where the routine 200C ends.

Figure 3A:
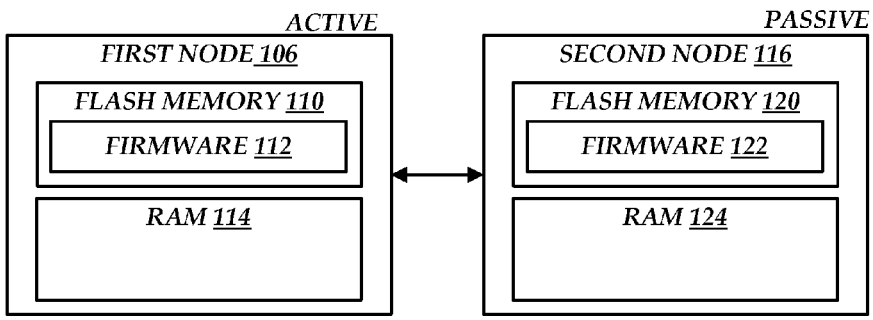
FIGS. 3A-D illustrate a series of computer architecture diagrams showing aspects of the first node and the second node throughout multiple firmware updates provided in one embodiment presented herein.

Referring now to FIGS. 3A-3D, a series of computer architecture diagrams showing aspects of the first node and the second node throughout multiple firmware updates are shown. The FIGS. 3A-D show embodiments of the high-availability computer system 100 including the first node 106 and the second node 116 throughout various stages of multiple firmware update processes. The FIG. 3A shows the first node 106 and the second node 116 before either of the nodes receives an updated firmware from the firmware update client 102. Thus, the first node 106 is operating the first current firmware 112 and the second node 116 is operating the second current firmware 122, which is the same as the first current firmware 112. Since the system 300A has yet to receive an updated firmware, the RAM 114, 124 of both the nodes 106, 116 do not contain a firmware image. However, in alternate embodiments, the passive node, which in this case is the second node 116, may store the firmware 112 in the RAM 124 of the second node 116.

Figure 3B:
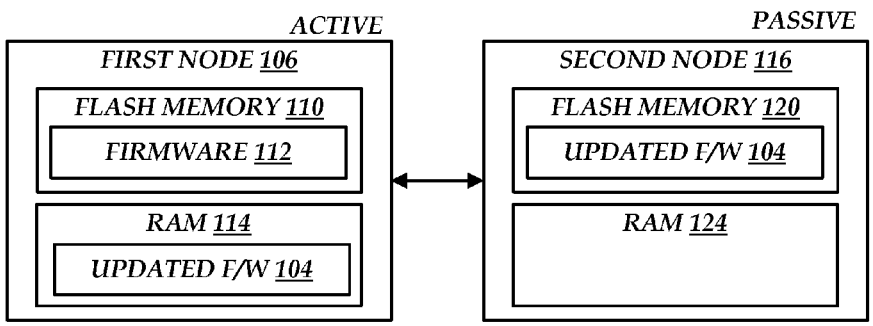

The FIG. 3B illustrates the system 100 after the first node 106 receives the updated firmware 104 from the firmware update client 102. Here, the first node 106 stores the updated firmware 104 in the RAM 114, and updates the second current firmware 122 with the updated firmware 104. Once the second current firmware 122 has been updated with the updated firmware 104, the second node 116 takes control of the system 100 as illustrated in FIG. 3C.

Figure 3C:
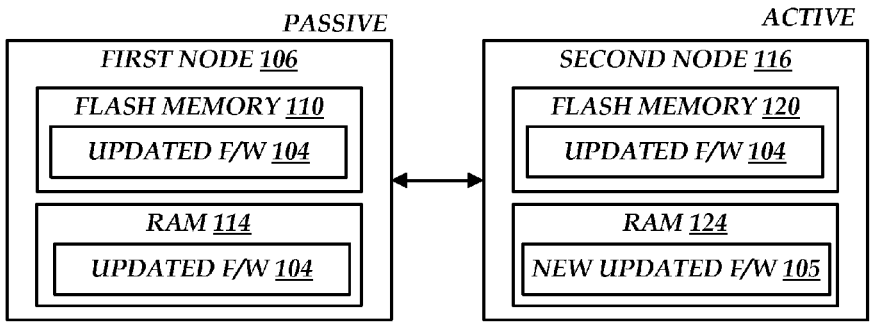

In FIG. 3C, the second node 116 is the active node and updates the first current firmware 112 with the updated firmware 104 stored in the flash memory 120 of the second node 116. At some point after updating the first current firmware 112, the second node 116 may receive a new updated firmware 105 from the firmware update client 102 and store the new received firmware 105 in the RAM 124 of the second node 116. The new updated firmware 105 may be a newer version of the updated firmware 104. The second node may then begin the firmware update process using the new updated firmware 105 by updating the first node's operating firmware, which is currently the updated firmware 104 with the new updated firmware 105. Once the current firmware of the first node 104, which is the updated firmware 104, has been updated with the new updated firmware 105, the first node 106 takes control of the system 100 as illustrated in FIG. 3D.

Figure 3D:
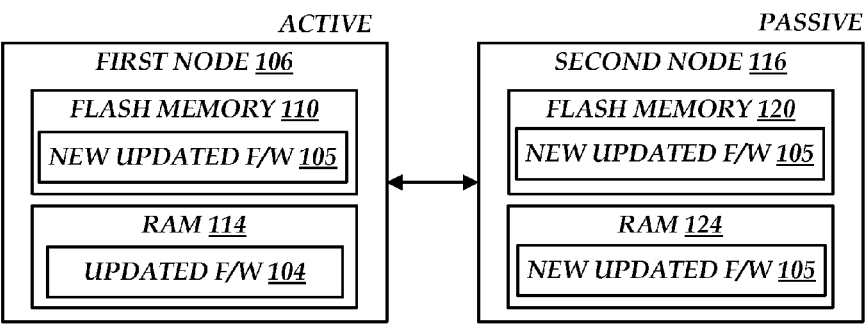

In FIG. 3D, the first node 106 again becomes the active node and updates the second current firmware, which is the updated firmware 104, with the new updated firmware 105 stored in the flash memory 110 of the first node 106. It should be understood that in various embodiments, such as the embodiment described in FIGS. 3A-D, the first node 106 and the second node 116 alternate receiving newer firmware updates and storing the new firmware updates in their respective RAM 114, 124. In this way, the RAM 114, 124 of both the nodes 106, 116 are being utilized. In alternate embodiments, only one of the nodes may be equipped with a RAM for storing firmware updates. In such embodiments, the node having the RAM takes back control of the system after having its firmware updated by the other node. In this way, the node having the RAM is always operating in active mode, except while undergoing a firmware update using the firmware of the other node and therefore, is ready to receive the firmware updates from the firmware update client 102 most of the time. In various embodiments, it should be appreciated that the contents of the RAM 114, 124 may be removed upon setting the passive node to active node. In this way, the RAM of one of the nodes may always be empty. However, it should be understood that these may be implementation dependent and in various embodiments, the RAM of a node may not be reset when the node switches between the active mode and the passive mode.

Figure 4:
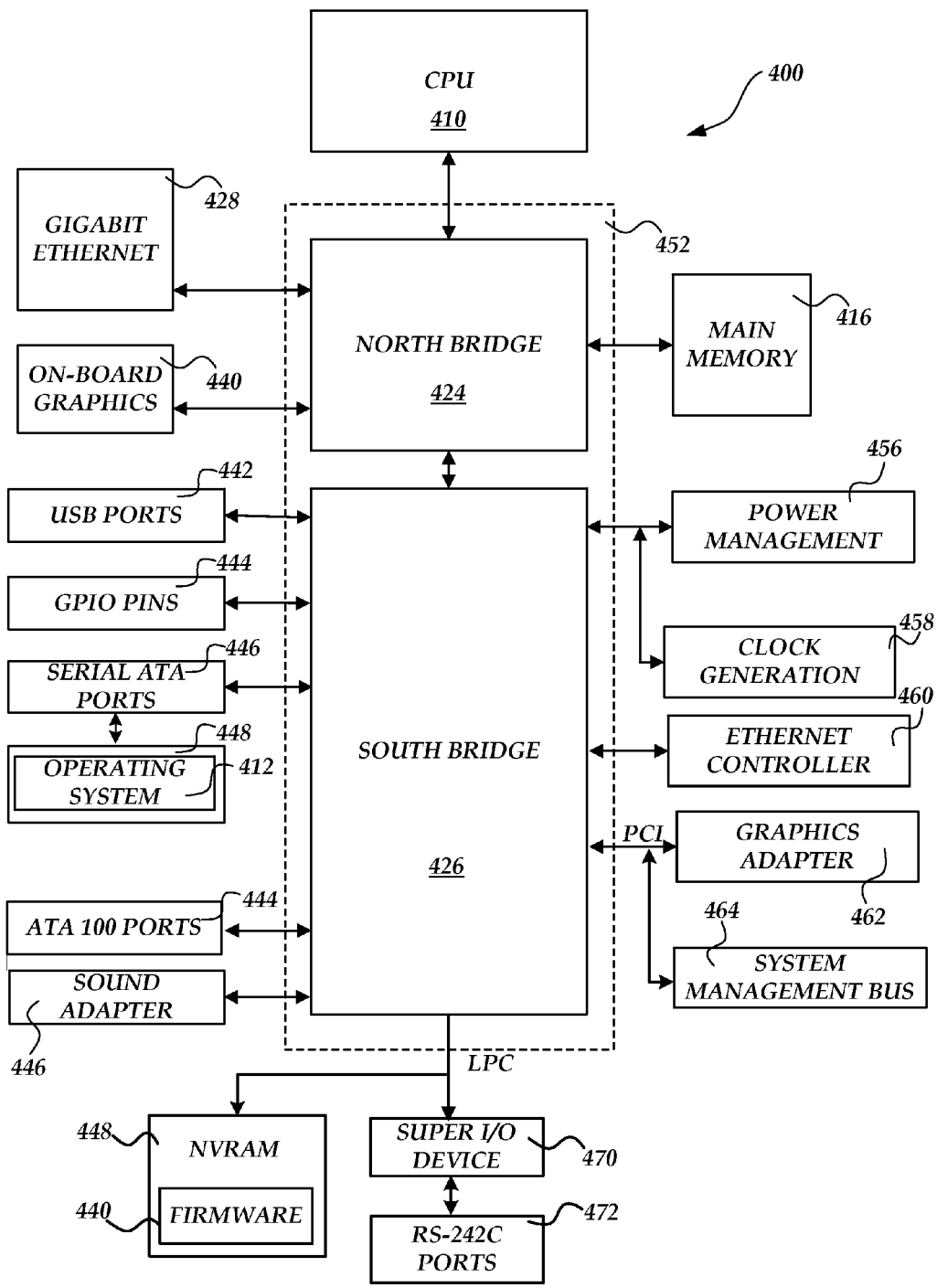
FIG. 4 is a computer architecture diagram showing an illustrative computer architecture for implementing the various computing systems presented herein.

FIG. 4 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

FIG. 4 shows a computer architecture for an illustrative computer 400 that may be utilized to embody the hardware and software components presented herein for the firmware update client 102, the first node 106, or the second node 116. Some or all of the architecture shown in FIG. 4 may also be utilized to implement the remote client 102. As discussed above, other types of computers and computing devices may also be utilized to implement the embodiments presented herein.

The computer 400 includes a baseboard, or "motherboard", which is a printed circuit board to which a multitude of components or devices may be connected by way of a system bus or other electrical communication path. In one illustrative embodiment, a CPU 410 operates in conjunction with a chipset 432. The CPU 410 is a standard central processor that performs arithmetic and logical operations necessary for the operation of the computer. The computer 400 may include a multitude of CPUs 410.

The chipset 432 includes a north bridge 424 and a south bridge 426. The north bridge 424 provides an interface between the CPU 410 and the remainder of the computer 400. The north bridge 424 also provides an interface to a random access memory ("RAM") used as the main memory 416 in the computer 400 and, possibly, to an on-board graphics adapter 430. The north bridge 424 may also include functionality for providing networking functionality through a gigabit Ethernet adapter 428. The gigabit Ethernet adapter 428 is capable of connecting the computer 400 to another computer via a network. Connections that may be made by the network adapter 428 may include LAN or WAN connections. LAN and WAN networking environments are commonplace in offices, enterprise-wide computer networks, intranets, and the Internet. The north bridge 424 is connected to the south bridge 426.

The south bridge 426 is responsible for controlling many of the input/output functions of the computer 400. In particular, the south bridge 426 may provide one or more universal serial bus ("USB") ports 432, a sound adapter 446, an Ethernet controller 460, and one or more general-purpose input/output ("GPIO") pins 434. The south bridge 426 may also provide a bus for interfacing peripheral card devices such as a graphics adapter 462. In one embodiment, the bus comprises a peripheral component interconnect ("PCI") bus. The south bridge 426 may also provide a system management bus 464 for use in managing the various components of the computer 400. Additional details regarding the operation of the system management bus 464 and its connected components are provided below.

The south bridge 426 is also operative to provide one or more interfaces for connecting mass storage devices to the computer 400. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 412 and application programs. As known to those skilled in the art, the operating system 412 comprises a set of programs that control operations of a computer and allocation of resources. An application program is software that runs on top of the operating system software, or other runtime environment, and uses computer resources to perform application specific tasks desired by the user. According to one embodiment of the invention, the operating system 412 comprises the LINUX operating system. According to another embodiment of the invention, the operating system 412 comprises the WINDOWS SERVER operating system from MICROSOFT CORPORATION. According to another embodiment, the operating system 412 comprises the UNIX or SOLARIS operating system. It should be appreciated that other operating systems may also be utilized.

The mass storage devices connected to the south bridge 426, and their associated computer-readable media, provide non-volatile storage for the computer 400. Although the description of computer-readable media contained herein refers to a mass storage device, such as a hard disk or CD-ROM drive, it should be appreciated by those skilled in the art that computer-readable media can be any available media that can be accessed by the computer 400. By way of example, and not limitation, computer-readable media may comprise computer-readable storage media and communication media. Computer-readable storage media includes volatile and nonvolatile, removable and non-removable media implemented in any method or technology for storage of information such as computer-readable instructions, data structures, program modules or other data. Computer-readable storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information.

A low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 430 that includes program code containing the basic routines that help to start up the computer 400 and to transfer information between elements within the computer 400.

It should be appreciated that the computer 400 may comprise other types of computing devices, including hand-held computers, embedded computer systems, personal digital assistants, and other types of computing devices known to those skilled in the art. It is also contemplated that the computer 400 may not include all of the components shown in FIG. 4, may include other components that are not explicitly shown in FIG. 4, or may utilize an architecture completely different than that shown in FIG. 4.

It should be appreciated that the software components described herein may, when loaded into the CPU 410 and executed, transform the CPU 410 and the overall computer 400 from a general-purpose computing system into a special-purpose computing system customized to facilitate the functionality presented herein. The CPU 410 may be constructed from any number of transistors or other discrete circuit elements, which may individually or collectively assume any number of states. More specifically, the CPU 410 may operate as a finite-state machine, in response to executable instructions contained within the software modules disclosed herein. These computer-executable instructions may transform the CPU 410 by specifying how the CPU 410 transitions between states, thereby transforming the transistors or other discrete hardware elements constituting the CPU 410.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 in order to store and execute the software components presented herein. It also should be appreciated that the computer 400 may comprise other types of computing devices, including hand-held computers, embedded computer systems, personal digital assistants, and other types of computing devices known to those skilled in the art. It is also contemplated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for updating firmware in a high availability enabled solution are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system for updating firmware in a high availability enabled computer system, comprising:
   a first node operating a first current firmware and having an updated firmware stored thereon; and
   a second node operating a second current firmware, wherein the first and second notes are redundant to each other, wherein the first node is configured to, when the first node is active and the second node is passive, send the updated firmware to the second node and update the second current firmware with the updated firmware;
   upon a successful firmware update, set a second indicator flag on the second node, the second indicator flag notifying the second node to act as an active node and to update the first current firmware of the first node upon reboot;
   store the updated firmware on a memory of the first node, read a block of the updated firmware from the memory;
   update a block of the second current firmware corresponding to the block of the updated firmware;
   determine whether the update of the block of the second current firmware is successful;
   upon determining that the update of the block of the second current firmware is successful, read a subsequent block of the updated firmware from the memory and update a subsequent block of the second current firmware corresponding to the subsequent block of the updated firmware;

upon determining that the update of the block of the second current firmware is not successful, read a block of the first current firmware corresponding to the unsuccessfully updated block of the second current firmware, and update the unsuccessfully updated block of the second current firmware using the block of the first current firmware; and reboot the second node;

wherein second node is configured to, when the first node is passive and the second node is active, send the updated firmware to the first node and update the first current firmware with the updated firmware.

2. The system of claim 1, wherein the second node is configured to upon rebooting, determine whether the second indicator flag is set, in response to determining that the second indicator flag is set, take control of the computer system from the first node, upon taking control of the computer system, update the first current firmware of the first node with the updated firmware, and reboot the first node.

3. The system of claim 2, wherein the first node is operating in an active mode when the first node is in control of the computer system and the second node is operating in a passive mode when the second node is not in control of the computer system prior to rebooting the second node; and upon determining that the second indicator flag is set, the first node switches from operating in the active mode to operating in the passive mode, and the second node switches from operating in the passive mode to operating in the active mode.

4. The system of claim 2, wherein the second node is further configured to set a first indicator flag on the first node, the first indicator flag configured to notify the first node to take control of the computer system from the second node upon rebooting the first node; and wherein the first node is further configured to upon rebooting the first node, determine whether the first indicator flag is set, and upon determining that the first indicator flag is set, take control of the computer system from the second node such that the second node is not in control of the computer system.

5. The system of claim 1, further comprising a firmware update client comprising the updated firmware stored thereon, the firmware update client configured to receive a firmware version of the first current firmware from the first node, determine whether the updated firmware is newer than the firmware version of the first current firmware, and upon determining that the updated firmware is newer than the first current firmware, send a firmware update command to the first node.

6. The system of claim 5, wherein the firmware update client is further configured to upon determining that the updated firmware is not newer than the current firmware version of the first current firmware, solicit permission to proceed with updating the first current firmware with the updated firmware, receive the permission to proceed with updating the first current firmware with the updated firmware, and upon receiving the user input to proceed with updating the first current firmware, send the firmware update command to the first node instructing the first node to update the second current firmware of the second node.

7. The system of claim 1, wherein the first node is further configured to determine whether the update to the unsuccessfully updated block of the second current firmware using the block of the first current firmware is successful, and upon determining that the update is not successful, update the unsuccessfully updated block of the second current firmware using the block of the first current firmware until the update is unsuccessful in a threshold number of attempts.

8. The system of claim 7, wherein the first node is further configured to upon being unsuccessful in updating the unsuccessfully updated block of the second current firmware using the block of the first current firmware in the threshold number of attempts, log an event indicating that the threshold number of attempts has been reached, and upon logging the event, abort updating the second current firmware.

9. The system of claim 7, wherein upon determining that the update to the, unsuccessfully updated block of the second current firmware using the block of the first current firmware is successful, update subsequent blocks of the second current firmware using subsequent blocks of the first current firmware corresponding to the subsequent blocks of the second current firmware.

10. The system of claim 1, wherein the first node comprises a non-volatile memory configured to store the first current firmware and a random access memory configured to store the updated firmware retrieved from the firmware update client the first and the second non-volatile memory comprise a flash memory, and the first and second volatile memory comprise a random access memory (RAM).

11. A computer-implemented method for updating firmware in a high availability enabled computer system, the high availability enabled computer system including a first node and a second node that are redundant to each other, the method comprising:

receiving an updated firmware at a first node operating a first current firmware;

when the first node is active and the second node is passive:
sending the updated firmware from the first node to the second node and updating a second current firmware operating on a second node with the updated firmware;

setting a second indicator flag on the second node, the second indicator flag notifying the second node to act as an active node and to update the first current firmware of the first node upon reboot;

storing the received updated firmware in a memory of the first node;

reading a block of the updated firmware from the memory; updating a block of the second current firmware corresponding to the block of the updated firmware;

determining whether the update of the block of the second current firmware is successful; upon determining that updating the block of the second current firmware is successful, reading a subsequent block of the updated firmware from the memory and updating a subsequent block of the second current firmware corresponding to the subsequent block of the updated firmware;

upon determining that updating the block of the second current firmware is not successful, reading a block of the first current firmware corresponding to the unsuccessfully updated block of the second current firmware and updating the unsuccessfully updated block of the second current firmware using the block of the first current firmware;

and rebooting the second node;

upon rebooting the second node, determining whether the second indicator flag is set;

in response to determining that the second indicator flag is set, the second node acting as an active node; and when the first node is passive and the second node is active, sending the updated firmware from the second node to the first node and updating the first current firmware with the updated firmware.

12. The method of claim 11, further comprising prior to receiving the updated firmware at the first node, determining whether the updated firmware is newer than the first current firmware;
   upon determining that the updated firmware is newer than the first current firmware, receiving the updated firmware at the first node;
   upon determining that the updated firmware is not newer than the first current firmware, soliciting permission to proceed with updating the first current firmware and the second current firmware with the updated firmware; and
   upon receiving permission to proceed with updating the first current firmware and the second current firmware with the updated firmware, receiving the updated firmware at the first node.

13. The method of claim 12, further comprising:
   storing the received updated firmware in a memory of the first node;
   reading a block of the updated firmware from the memory;
   updating a block of the second current firmware corresponding to the block of the updated firmware;
   determining whether the update of the block of the second current firmware is successful;
   upon determining that updating the block of the second current firmware is successful, reading a subsequent block of the updated firmware from the memory and updating a subsequent block of the second current firmware corresponding to the subsequent block of the updated firmware; and
   upon determining that updating the block of the second current firmware is not successful, reading a block of the first current firmware corresponding to the unsuccessfully updated block of the second current firmware and updating the unsuccessfully updated block of the second current firmware using the block of the first current firmware.

14. The method of claim 13, further comprising determining whether the update to the unsuccessfully updated block of the second current firmware using the block of the first current firmware is successful, upon determining that the update to the unsuccessfully updated block of the second current firmware using the block of the first current firmware is not successful, updating the unsuccessfully updated block of the second current firmware using the block of the first current firmware until the update is not successful a threshold number of attempts.

15. The method of claim 14, wherein upon determining that updating the second current firmware using the corresponding block of the first current firmware is successful, updating subsequent blocks of the second current firmware using subsequent blocks of the first current firmware.

16. The method of claim 14, wherein upon being unsuccessful in updating the block of the second current firmware using the same corresponding block of the first current firmware the threshold number of attempts, logging an event indicating that the threshold number of attempts has been reached, and upon logging the event, aborting updating the second current firmware.

17. The method of claim 11, wherein updating the first current firmware with the updated firmware comprises:
   reading a block of the updated firmware of the second node;
   updating a corresponding block of the first current firmware with the block of the updated firmware of the second node;
   upon updating the corresponding block of the first current firmware, reading a subsequent block of the updated firmware of the second node and updating a subsequent corresponding block of the first current firmware until all of the blocks of the first current firmware have been updated; and
   upon all of the blocks of the first current firmware having been updated, setting a first indicator flag on the first node, the first indicator flag notifying the first node to take control of the system upon reboot; and
   rebooting the first node.

18. A system for updating firmware in a high availability enabled solution, comprising:
   a first node operating a first current firmware and having an updated firmware stored in a memory; and
   a second node operating a second current firmware, wherein the first and second nodes are redundant to each other, wherein the first node is configured to, when the first node is active and the second node is passive:
   read a block of the updated firmware from the memory;
   update a block of the second current firmware operating on the second node corresponding to the block of the updated firmware;
   determine whether the update of the block of the second current firmware is successful;
   upon determining that the update of the block of the second current firmware is successful, read a subsequent block of the updated firmware from the memory;
   upon determining that the update of the block of the second current firmware is not successful, read a block of the first current firmware corresponding to the unsuccessfully updated block of the second current firmware, and update the unsuccessfully updated block of the second current firmware using the block of the first current firmware;
   update a subsequent block of the second current firmware corresponding to the subsequent block of the updated firmware;
   upon updating the subsequent block of the second current firmware, repeat the read, update and determine operations until all of the blocks of the second current firmware have been updated;
   upon updating all of the blocks of the second current firmware, set an indicator flag on the second node, the indicator flag notifying the second node to act as an active node and to update the first current firmware operating on the first node upon reboot; and
   reboot the second node, wherein second node is configured to, when the first node is passive and the second node is active, send the updated firmware to the first node and update the first current firmware with the updated firmware.

19. The system of claim 18, wherein the second node is configured to upon rebooting the second node, determine whether the indicator flag is set, in response to determining that the indicator flag is set, taking control of the system from the first node,
   upon taking control of the system from the first node, read a block of the updated firmware operating on the second node, update a block of the first current firmware corresponding to the block of the updated firmware operating on the second node, determine whether the update of the block of the first current firmware is successful, upon determining that the update of the block of the first current firmware is successful, read a subsequent block of the updated firmware operating on the second node, update a subsequent block of the first current firmware corresponding to the subsequent block of the updated firmware operating on the second node, and upon updating the subsequent block of the first current firmware, repeat the read, update and determine operations until all of the blocks of the first current firmware have been updated.

\* \* \* \* \*